United States Patent [19]

Parrow

[11] Patent Number: 5,038,477
[45] Date of Patent: Aug. 13, 1991

[54] UNIVERSAL SIDING CUTTING

[76] Inventor: Harold A. Parrow, Box 361, Main St., Perley, Minn. 56574

[21] Appl. No.: 543,460

[22] Filed: Jun. 26, 1990

[51] Int. Cl.⁵ .............................................. B26B 13/00
[52] U.S. Cl. ...................................... 30/253; 30/258; 83/607; 83/609
[58] Field of Search ................... 30/253, 258; 83/594, 83/601–609, 694

[56] References Cited

U.S. PATENT DOCUMENTS

| 1,044,966 | 11/1912 | Adams et al. | |
|---|---|---|---|
| 2,219,602 | 10/1940 | Rayner | |
| 2,563,741 | 8/1951 | Cutter | |
| 3,134,285 | 5/1964 | Greene | |
| 3,279,295 | 10/1966 | Teplitz | 83/601 |
| 3,362,070 | 1/1968 | Huggins | 30/253 X |
| 3,457,818 | 7/1969 | McManus | |
| 3,780,436 | 12/1973 | Pellman | 30/355 X |
| 4,401,002 | 8/1983 | Worsham | 83/589 X |

FOREIGN PATENT DOCUMENTS 1552662  2/1970  Fed. Rep. of Germany .

Primary Examiner—Douglas D. Watts
Attorney, Agent, or Firm—Merchant, Gould, Smith, Edell, Welter & Schmidt

[57] ABSTRACT

An apparatus for cutting aluminum siding or like articles includes a movable blade and a pair of fixed blades between which the movable blade is mounted to pivot. The fixed blades are each mounted on a rail that is rigidly connected to a flexible base member. An adjustment bolt is provided for exerting force between the rails. Force from the adjustment bolt causes the base member to deflect, thereby permitting the distance between the fixed blades to be varied. A second feature includes the provision of different sets of fixed blades, each configured to conform to a different type of siding. A novel movable blade is also provided.

11 Claims, 4 Drawing Sheets

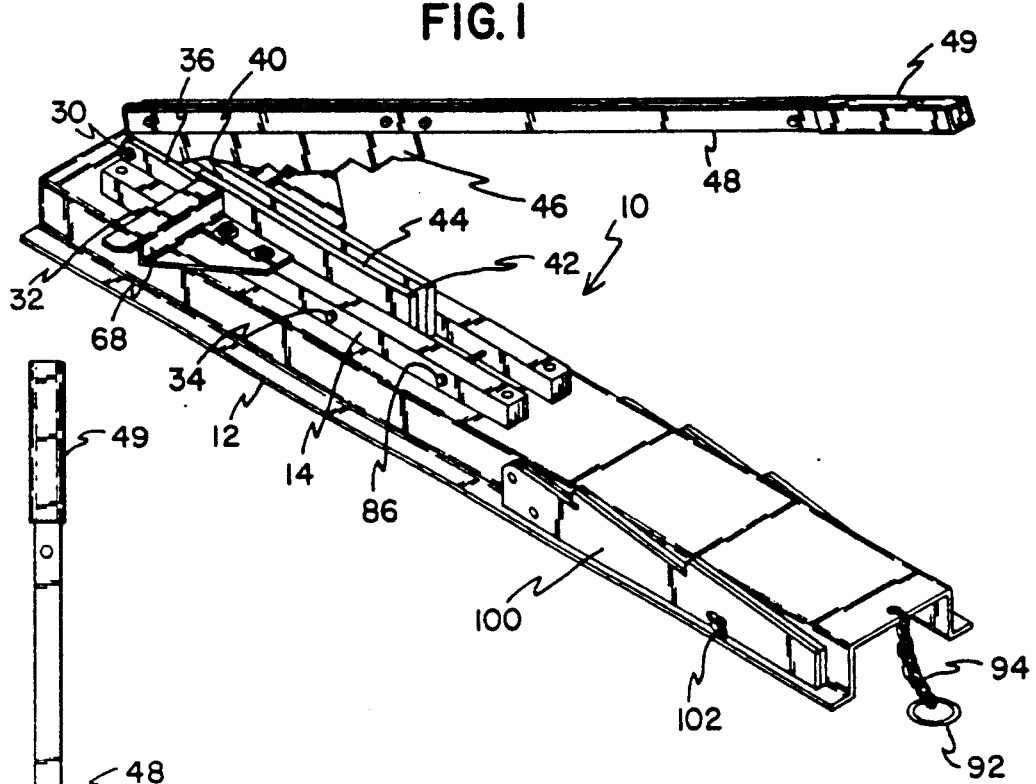
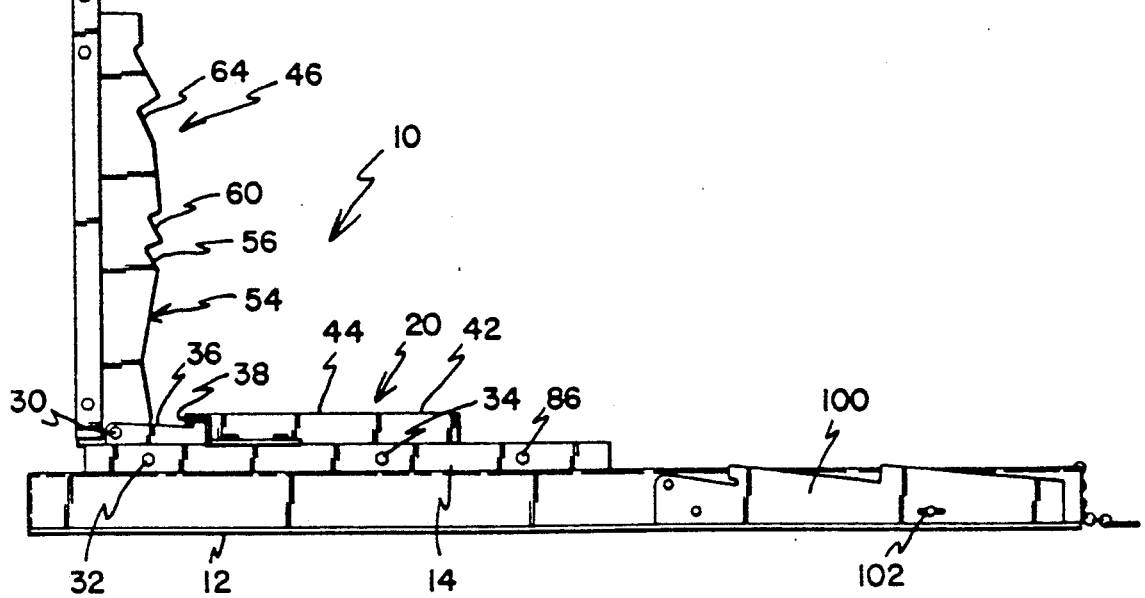

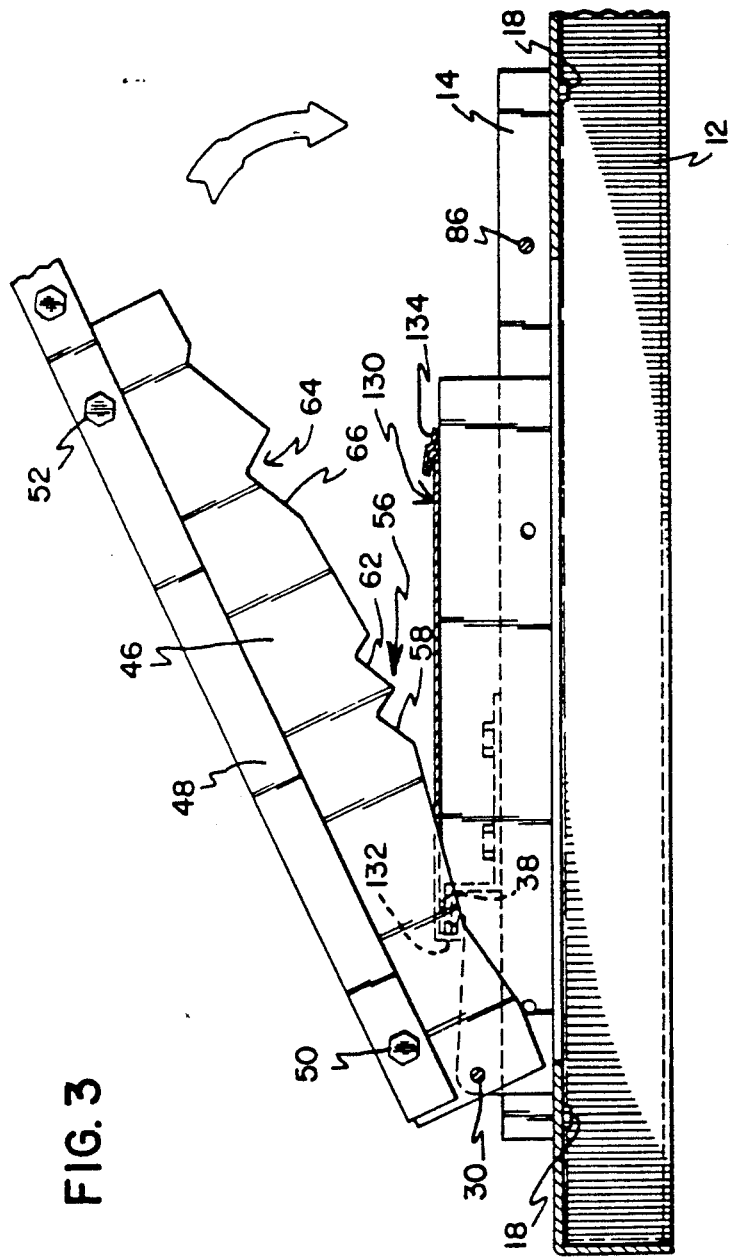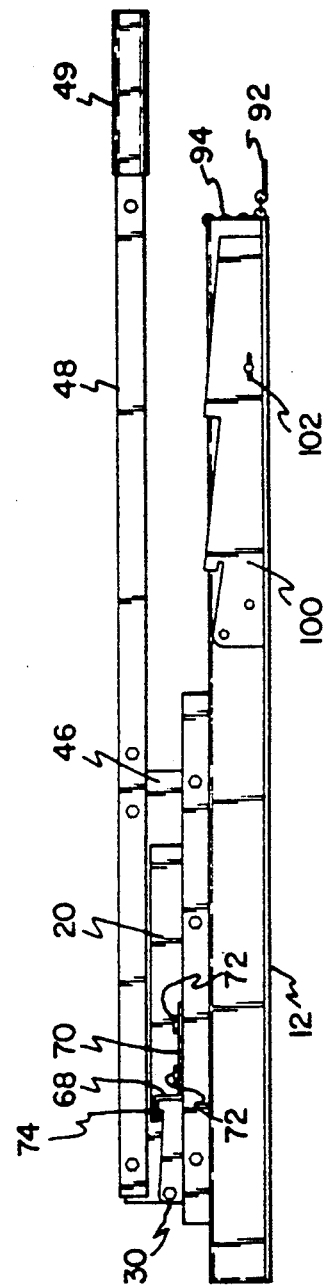

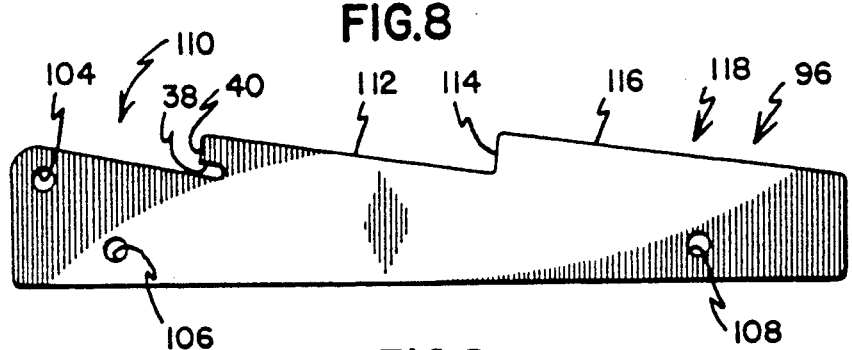
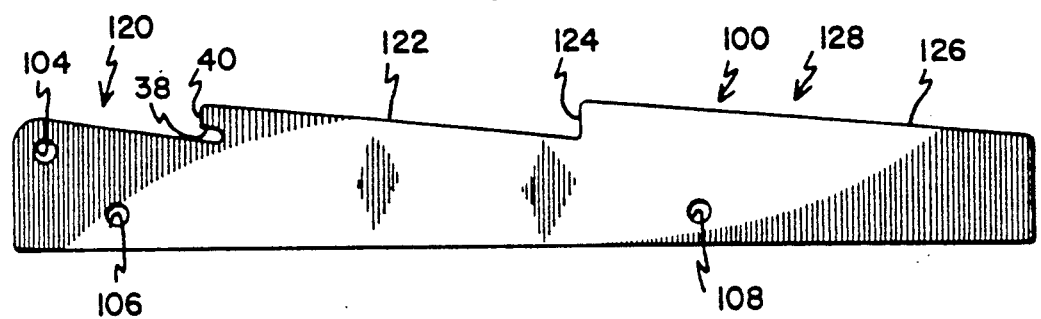
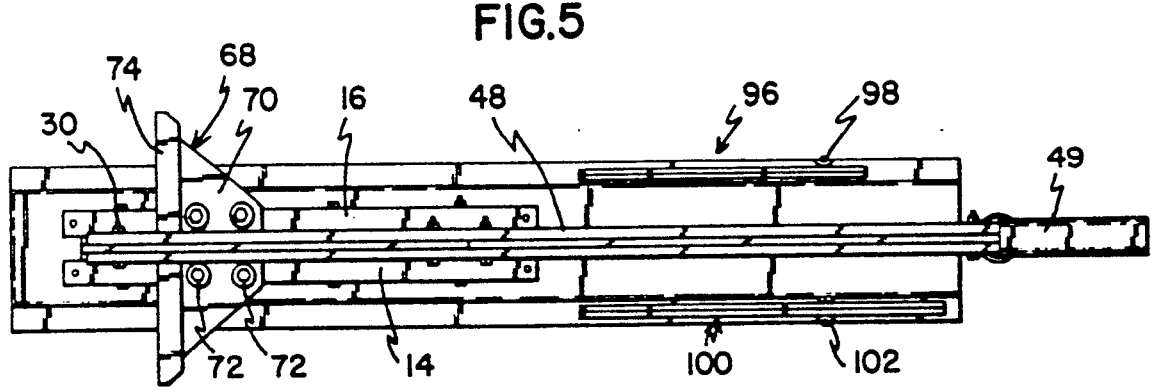
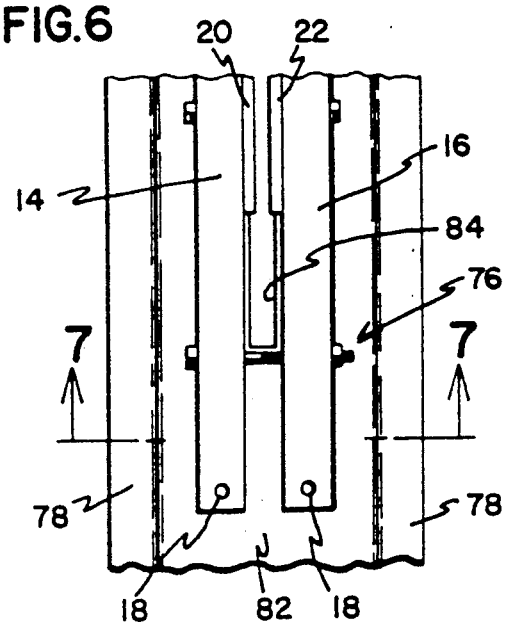
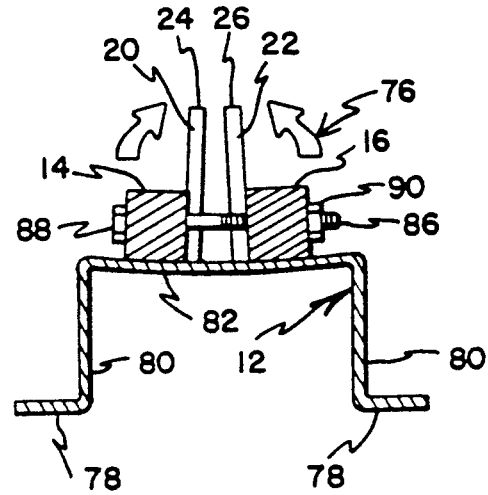

UNIVERSAL SIDING CUTTING

BACKGROUND OF THE INVENTION

1. Field of the Invention

This invention relates to devices which are used to cut a piece of siding prior to its installation onto the exterior of a building. Specifically, this invention provides a universal siding cutter which can be used to safely and precisely cut several different types of siding.

2. Description of the Prior Art

Strip siding is widely used in the construction industry to provide a protective, attractive exterior surface to buildings. Siding strips are most commonly fabricated from aluminum or steel, although siding made from plastic is also available. Many different configurations of siding material are also available. For example, a "straight eight" length of siding gives the appearance of a straight shingle that is approximately eight inches long. The "double four" and "double five" types of siding are constructed so as to give the appearance of an upper and a lower shingle each having, respectively depending upon the siding type, four or five inches in width. Many other different configurations of siding are commercially available in addition to those discussed above.

During installation, it often becomes necessary to cut or trim individual lengths of siding to conform to the external dimensions of the building to which the siding is to be applied. Machines which have been previously developed for accomplishing this function are disclosed in U.S. Pat. Nos. 3,134,235 and 3,279,295.

Although such machines could effectively cut siding to a desired length, they often also deformed the siding during cutting, particularly in flanged areas or in the vertical step area between the two flat shingle portions in a double width piece of siding. Such deformation often had to be manually corrected after making each cut. Over the course of an entire project, this could become an expensive and time-consuming task for a siding contractor.

It is clear that there has existed a long and unfilled need in the prior art for an improved siding cutter that is adaptable to different types of siding and which will not deform the siding during cutting.

SUMMARY OF THE INVENTION

Accordingly, it is an object of this invention to provide an improved siding cutter that is adaptable for cutting different types of siding.

It is further an object of the invention to provide a siding cutter that will not deform the siding during cutting.

In order to achieve these and other objects of the invention, an apparatus for cutting a length of siding constructed according to a first aspect of the invention includes a base; a first rail mounted on the base, a second rail mounted on the base in spaced parallel relationship to the first rail; a first fixed blade releasably mounted to the first rail; a second fixed blade releasably mounted to the second rail; a movable blade pivotally mounted between the first and second fixed blades; and structure supported by the base which is adapted for securing an alternate set of first and second blades thereto, the alternate set of first and second blades having a different configuration than the first fixed blade and the second fixed blade, whereby the apparatus is adaptable to efficiently cut more than one type of siding.

An apparatus for cutting a length of siding according to a second aspect of the invention includes a base; a first rail mounted on the base; a second rail mounted on the base in spaced parallel relationship to the first rail; a first fixed blade mounted to the first rail; a second fixed blade mounted to the second rail; a movable blade pivotally mounted between the first and second fixed blades; and structure for adjustable biasing the first rail with respect to the second rail to adjust the distance between the first and second fixed blades, whereby the spacing of the fixed blades relative to the movable blade may be optimally adjusted.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 1 is a perspective view of an apparatus constructed according to a first embodiment of the invention;

FIG. 2 is a side elevational view of the apparatus depicted in FIG. 1, with a movable blade shown in an upright position.

FIG. 3 is a fragmentary cross-sectional view of the apparatus depicted in FIGS. 1 and 2, shown during cutting;

FIG. 4 is a side elevational view of the embodiment depicted in FIGS. 1-3, shown in a closed position;

FIG. 5 is a top plan view of the cutter depicted in FIGS. 1-4, with the cutter shown in its closed position;

FIG. 6 is a top fragmentary plan view showing a portion of the apparatus depicted in FIGS. 1-5, with the cutter shown in an open position;

FIG. 7 is a cross-sectional view through lines 7—7 in FIG. 6;

FIG. 8 is a side elevational view of a first replacement blade to be used with the apparatus shown in FIGS. 1-7;

FIG. 9 is a side elevational view of a second replacement blade, to be used with the apparatus illustrated in FIGS. 1-7.

DETAILED DESCRIPTION OF THE PREFERRED EMBODIMENT(S)

Figure 10:
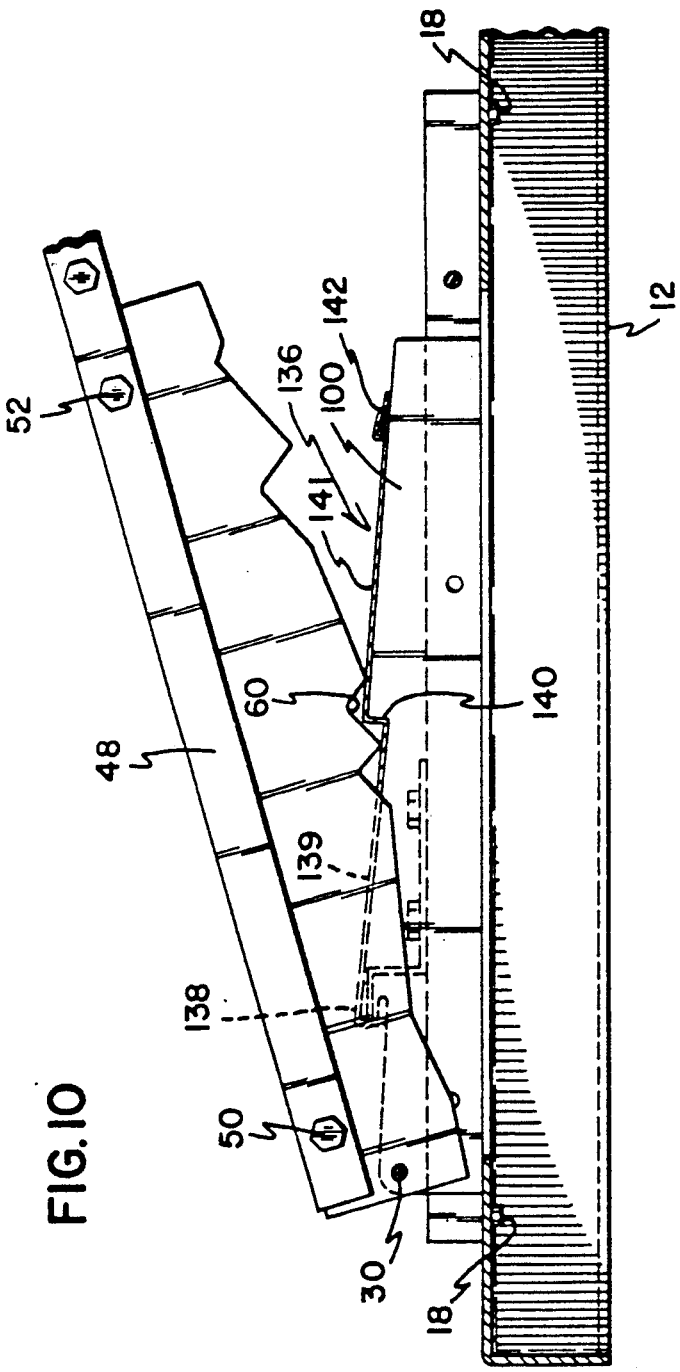
FIG. 10 is a fragmentary cross-sectional view of the cutter shown in FIGS. 1-7 during operation with one of the alternate blades in place.

Referring now to the drawings, wherein like reference numerals designate corresponding structure throughout the views, and referring in particular to FIGS. 1-7, an apparatus 10 for cutting strip siding includes a base 12 having a first rail 14 and a second rail 16 mounted thereto by a plurality of bolts 18. As may best be seen in FIG. 5, first rail 14 is mounted in a spaced, parallel relationship with respect to second rail 16. As may be seen in FIGS. 6 and 7, rails 14, 16 have a space defined therebetween in which a first fixed blade 20 and a second fixed blade 22 are mounted. First fixed blade 20 is mounted to an interior surface of first rail 14 by a third mounting bolt 32 and a fourth mounting bolt 34, as may be seen in FIG. 2. Second fixed blade 22 is likewise mounted to an interior surface of second rail 16 by a pair of mounting bolts which are symmetrically opposed to third mounting bolt 32 and fourth mounting bolt 34. As may be seen in FIG. 7, first fixed blade 20 has a flat upper surface 44 which, in conjunction with an inner surface thereof, defines a top inside cutting edge 24. Similarly, a top surface and an inside side surface of second fixed blade 22 intersect to form a top, inside cutting edge 26.

Looking now to FIGS. 1 and 2, it will be noted that a first end 36 of first fixed blade 20 includes an overhanging lip portion 40 having a slot 38 defined therein for receiving and holding a flanged portion of a length of siding. Lip portion 40 and slot 38 are identical to those in the alternate sets of fixed blades which are illustrated in FIGS. 8 and 9. A second end 42 of first fixed blade 20 includes the flat upper surface 44, which is configured to be complementary to a flat portion on a length of single width siding. In the preferred embodiment, fixed blades 20, 22 are adapted to conform to the surface of a strip of "straight eight" siding. However, it is to be understood that all types of commercially available siding are within the ambit of the invention.

Referring again to FIG. 2, a movable blade 46 having an elongate handle 48 mounted thereto is pivotally mounted between first fixed blade 20 and second fixed blade 22 by pivot bolt 30. Elongate handle 48 is provided with a resilient hand grip sleeve 49 at a distal end thereof, as may be seen in FIG. 2. As shown in FIG. 3, movable blade 46 is mounted to handle 48 by a first mounting bolt 50 and a second mounting bolt 52. Movable blade 46 includes an exposed surface 54, which together with the side surfaces of movable blade 46 defines a pair of parallel cutting edges. The parallel cutting edges are adapted to progressively contact the top inside cutting edges 24, 26 on first and second fixed blades 20, 22, respectively.

Surface 54 defines a first notch 56 in movable blade 46 which exposes a first progressively inclined cutting surface 58. A second notch 60 adjacent to first notch 56 similarly exposes a second progressively inclined cutting surface 62. A third notch 64 exposes a third progressively inclined cutting surface 66. As may be seen in FIG. 3, a purpose of third notch 64 is to allow progressively inclined cutting surface 66 to come into contact with a thickened nail strip portion 134 of a piece 130 of straight eight siding. This permits the nail strip 134 to be cut smoother and more gradually than would otherwise be possible. As may be seen in FIG. 10, second notch 60 allows progressive cutting surface 62 to contact a vertical break portion 140 in a piece 136 of double five type siding, to promote the smooth cutting of the double five type siding 136. Similarly, first notch 56 allows progressive cutting surface 58 to cut a vertical break portion on a length of double four type siding. It is to be understood that movable blade 46 could be provided with additional notches to cut thickened portions of other types of siding that are not specifically discussed herein.

As may best be seen in FIGS. 1 and 5, apparatus 10 further includes a pair of siding support members 68 which project outwardly from each of the fixed cutting blades 20, 22 to provide support for a length of siding. Siding support members 68 include a body portion 70 that is mounted to the respective one of the first and second rails 14, 16 by a pair of bolts 72. Each of the siding support members 68 further include a raised support surface 74, which is constructed to be flush or approximately level with the upper surface 44 of blades 20, 22. A support surface 74 is further positioned so as to have a forward edge that is substantially aligned with the overhanging lip portions 40 on each of the fixed cutter blades 20, 22. Thus, support members 68 function to both support and align a length of siding during cutting. As a result, stability during cutting is improved with respect to prior art devices, particularly when it is desired to cut a relatively short length of siding.

Referring now to FIG. 7, a novel mechanism 76 for adjusting the spacing between first fixed blade 20 and second fixed blade 22, and particularly, between cutting edges 24, 26 will be discussed. As may be seen in FIG. 7, base 12 is constructed of a unitary, preferably steel, beam having a pair of foot portions 78, a pair of vertical leg portions 80 and a plate-like web portion 82 having a flat upper surface to which the first and second rails 14, 16 are mounted. As may be seen in FIG. 7, rails 14, 16 are biased towards each other by an adjustment bolt 86 having a head 84 and a hexagonal nut 90 threaded thereon.

Periodically after making a number of cuts, or when an alternate set of fixed blades are inserted into the apparatus 10 for cutting a different configuration of siding, the spacing between cutting edges 24, 26 will need to be adjusted in order to provide the proper cutting pressure with respect to movable blade 46 when movable blade 46 is pivoted downwardly between fixed blades 20, 22. This is done by tightening or loosening adjustment nut 90 on bolt 86. When nut 90 is tightened on bolt 86, rails 14, 16 and thus blades 20, 22 are forced toward each other, thus causing the plate-like web portion 82 of base 12 to bow in response to the force which is generated by the adjustment bolt 86 and nut 90. When nut 90 is loosened on bolt 86, the spring action caused by the bowing of web portion 82 forces the first rail and second rail 16 apart, thus causing separation of the cutting edges 24, 26 on fixed blades 20, 22. In this way, an equilibrium of forces is achieved between the cutting edges 24, 26, during operation of the cutter. Since the force generated by nut 90 and bolt 86 is absorbed by web portion 82, deformation of the blades 20, 22 and the rails 14, 16 is prevented. The resilient force balance achieved between web portion 82 and the bolt nut couple 86, 90 also serves to preserve the proper cutting force between blades 20, 46, 22 during cutting.

As may be seen in FIG. 4, a safety ring 92 is flexibly connected to an end portion of base 12 by a chain 94. When the cutter 10 is not in use, safety ring 92 may be slipped about the hand grip sleeve 49 on handle 48, in order to keep handle 48 from separating from base 12. In this way, it is insured that the respective cutting surfaces are not exposed when the apparatus 10 is not in use.

Referring now to FIG. 5, one important aspect of the invention is the provision of alternate sets 96, 100 of fixed blades which may be bolted in position in lieu of fixed blades 20, 22 when it is desired to cut a length of siding which has a different configuration than the siding which is designed to be cut by fixed blades 20, 22. As may be seen in FIG. 5, the second and third sets of fixed blades 96, 100 are secured to the vertical leg portions 80 of base 12 by a respective pair of thumb screws 102.

The first alternate set 96 of fixed blades, shown in elevation in FIG. 8, are designed to conform to the external surface of a length of "double four" type siding. Similarly, the second alternate set 100 of fixed blades is shown in elevation in FIG. 9 and is configured to conform to the external surface of the length of "double five" type siding. Each of the set of the fixed blades 96 includes a hole 104 for receiving pivot bolt 30, a hole 106 for receiving the third mounting bolts 32 and a hole 108 for receiving the fourth mounting bolt 34. Fixed blades 20, 22 also include holes 104, 106 and 108, although such holes are not visible in any of the drawings herein. The fixed blades in alternate set 96 further include a slot 38 and an overhanging lip portion 40 provided in a first end 110 thereof for receiving and holding a flanged portion of the double four siding. A second end 118 includes a first incline surface 112, a vertical step portion 114 and a second incline surface 116. Surfaces 112, 114 and 118 are configured to conform to two straight sections and a vertical break section of the double four siding, much in the manner that will be described in greater detail with reference to the second alternate set of blades 100 in the double five siding.

Each of the fixed blades in the second alternate set 100 includes mounting holes 104, 106 and 108, which are identical in their spacing and position to those described above with reference to fixed blades 20, 22 and to the fixed blades and first alternate set 96. The fixed blades in set 100 further include a slot 38 and an overhanging lip portion 40 for receiving and holding a flange portion of the double five type siding. A second end 128 includes a first inclined surface 122, a vertical step portion 124 and a second inclined surface 126.

Referring now to FIG. 10, which depicts the second alternate set 100 of fixed blades installed in operative position within the apparatus 10, first inclined surface 122 is configured to conform with and engage a first straight section 139 of the double five type siding, vertical step 124 is configured to engage a vertical break portion of the siding and second inclined surface 126 is configured to engage and support a second straight section 141 of the siding. A bottom flange portion 138 of the siding is received in slot 38, in a manner that has been previously described.

In operation, an operator determines the type of siding that is to be cut, and mounts the proper set of fixed blades on base 12 by removing and reinserting the third mounting bolt 32 and fourth mounting bolt 34. The selected set of fixed blades is then pivotally mounted to movable blade 46 by inserting and fastening pivot bolt 30. The operator then adjusts nut 90 with respect to adjustment bolt 86 in order to achieve the proper spacing and bias between the movable blade 46 and the selected set of fixed blades. It will be apparent that the provision of blade adjustment mechanism 76 further makes it possible to interchange sets of fixed blades without compromising the precision and efficiency of the cutter 10.

At this time, the non-selected set of fixed blades may be affixed to base 12 by means of one of the thumb screws 100, 102. A length of siding is then placed so that its flanged end is inserted in the slots 38 in the fixed blades, in a manner so that it is supported and held by the aligned effect of the siding support members 68 and the overhanging lip portion 40 on the fixed blades. Handle 48 may then be pivoted downwardly, causing movable blade 46 to act in conjunction with the fixed blades to cut the length of siding. During cutting, the progressive cutting surfaces 58, 62, 66 on movable blade 48 will ensure that the thickened portions of the siding member are cut cleanly, with a minimum of deformation. At the same time, the fixed blades will contribute to the smooth cutting of the siding, since they conform in cross section to the profile of the siding.

Once cutting is completed, handle 48 is again pivoted upwardly, and the process may be repeated for as many times as is necessary. After the desired number of cuts have been made, handle 48 is then pivoted downwardly to the position which is shown in FIG. 4, and the safety ring 92 is slipped about hand grip sleeve 49, so as to secure the apparatus 10 in a safe, unexposed position when it is not in use.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for cutting a length of siding, comprising:
   a base;
   a first rail mounted on said base;
   a second rail mounted on said base in spaced parallel relationship to said first rail;
   a first fixed blade mounted to said first rail;
   a second fixed blade mounted to said second rail;
   a movable blade pivotally mounted between said first and second fixed blades; and
   means for adjustably biasing said first rail with respect to said second rail to adjust the distance between said first and second fixed blades, whereby the spacing of said fixed blades relative to said movable blade may be optimally adjusted, said base including a plate-like web portion having a flat upper surface to which said first and second rails are mounted, said web portion being formed of a thickness so as bow in response to force from said adjustable biasing means, whereby deformation of said blades and said rails is prevented.

2. An apparatus according to claim 1, further comprising an opening defined in said base between said first and second rails for allowing scrap to fall beneath said base after cutting.

3. An apparatus according to claim 1, wherein said first and second blades are configured to fit the contour of a particular type of siding which is to be cut.

4. An apparatus according to claim 3, further comprising means on said base for attaching at least one additional pair of first and second fixed blades, which may be configured to fit the contour of a different type of siding than the first pair of first and second blades are configured to fit.

5. An apparatus according to claim 1, wherein said first and second fixed blades each have slots defined therein for receiving and holding a flanged portion of the siding.

6. An apparatus according to claim 5, further comprising a support member mounted to one of said rails for providing support to the siding during cutting, said support member including a raised support surface which is approximately level with an upper surface of said rail.

7. An apparatus according to claim 1, wherein said movable blade has a surface defining a pair of cutting edges at each end thereof, said surface having at least one notch formed therein defining a respective pair of progressively inclined cutting edge portions for cutting thicker portions of the siding.

8. An apparatus according to claim 7, wherein said surface has a plurality of said notches formed therein, in order to be adaptable to cut different types of siding.

9. An apparatus according to claim 1, further comprising an elongate handle connected to said movable blade.

10. An apparatus according to claim 9, further comprising means for releasably securing said handle to said base.

11. An apparatus for cutting a length of siding, comprising:
 a base;
 a first rail mounted on said base;
 a second rail mounted on said base in spaced parallel relationship to said first rail;
 a first fixed blade mounted to said first rail, said first fixed blade having a first slot defined therein for receiving and holding a flanged portion of a length of siding;
 a second fixed blade mounted to said second rail, said second fixed blade having a second slot defined therein for receiving a flanged portion of the length of siding;
 a movable blade pivotally mounted between said first and second fixed blades;
 a support member mounted to one of said first and second rails for providing support to the siding during cutting, said support member including a raised support surface which is approximately level with an upper surface of said one rail; and
 means for adjustably biasing said first rail with respect to said second rail to adjust the distance between said first and second fixed blades, whereby the spacing of said fixed blades relative to said movable blade may be optimally adjusted.

* * * * *

UNITED STATES PATENT AND TRADEMARK OFFICE
CERTIFICATE OF CORRECTION

PATENT NO.  : 5,038,477
DATED       : August 13, 1991
INVENTOR(S) : Harold A. Parrow It is certified that error appears in the above-identified patent and that said Letters Patent is hereby corrected as shown below:

ON THE TITLE PAGE, ITEM [54] AND IN COLUMN 1, LINE 1,
IN THE TITLE:

Delete "CUTTING" and Insert therfor --CUTTER

COLUMN 5, LINE 6:

Delete "bolts" and Insert therefor --bolt--

COLUMN 6, LINE 41:

Insert --to-- after "as"

Signed and Sealed this

Sixteenth Day of March, 1993

*Attest:*

STEPHEN G. KUNIN

*Attesting Officer*     Acting Commissioner of Patents and Trademarks